Aug. 25, 1953     A. M. CHAMBERS, JR., ET AL     2,650,117
SEALING DEVICE
Filed Jan. 19, 1950                             2 Sheets-Sheet 1
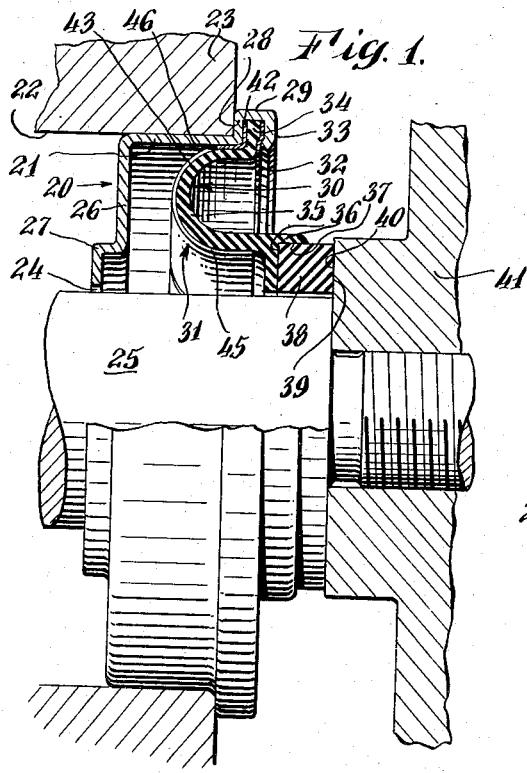
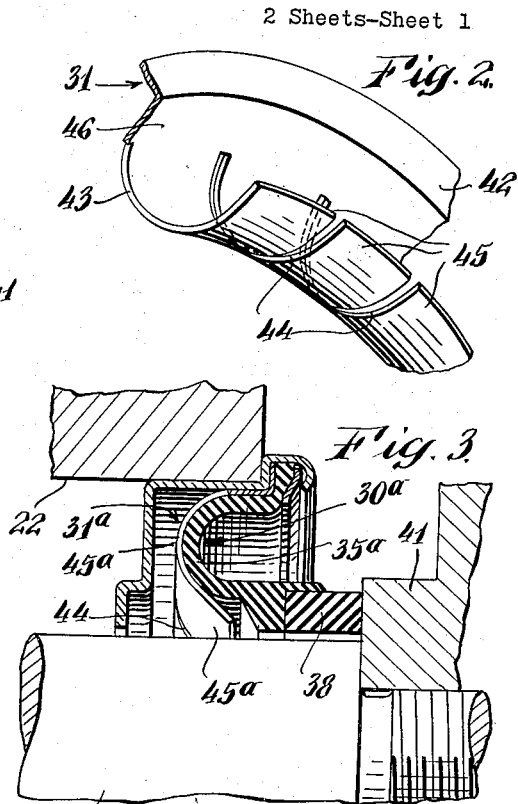
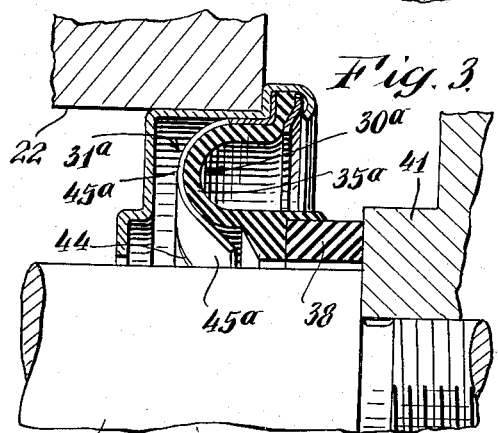
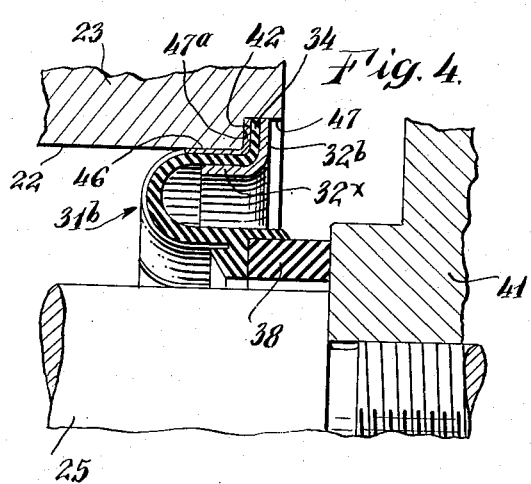
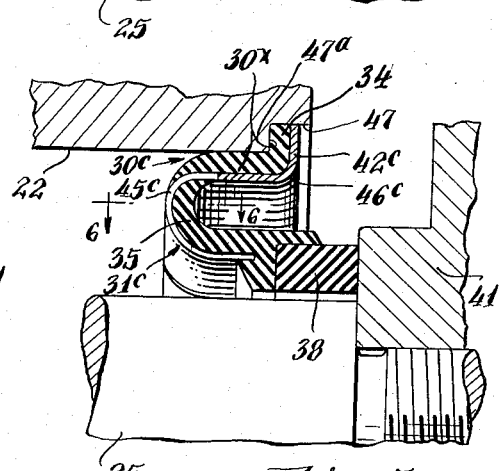
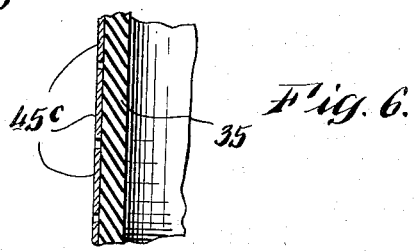
INVENTORS:
Albert M. Chambers, Jr.
BY    Leo F. Jones
ATTORNEYS Aug. 25, 1953    A. M. CHAMBERS, JR., ET AL    2,650,117
SEALING DEVICE
Filed Jan. 19, 1950    2 Sheets-Sheet 2
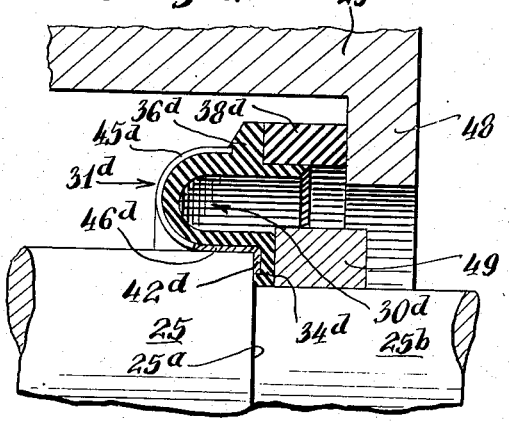
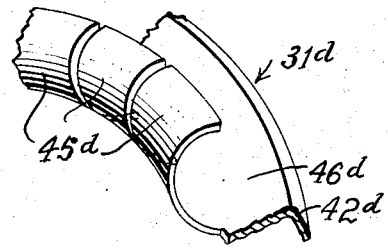
INVENTORS.
Albert M. Chambers, Jr.
BY  Leo F. Jones
Frazier, Myers & Manley
ATTORNEYS.

Patented Aug. 25, 1953

2,650,117

UNITED STATES PATENT OFFICE 2,650,117

SEALING DEVICE

Albert M. Chambers, Jr., and Leo F. Jones, Palmyra, N. Y., assignors to The Garlock Packing Company, Palmyra, N. Y., a corporation of New York Application January 19, 1950, Serial No. 139,474

8 Claims. (Cl. 286—11)

This invention relates to rotary seal devices for use in effecting a seal against escape of fluid between relatively rotatable machine elements such as, for example, a pump casing or other machine casing and a rotatable shaft extending through such a casing.

Many rotary seals heretofore developed employ a flexible annular diaphragm or equivalent member of rubber-like material for effecting a fluid-tight connection between a machine element and a wear ring which is adapted to effect a running seal with a radial surface formed on another machine element. Sometimes, as in several embodiments illustrated in the accompanying drawings, the wear ring is fixedly associated with the diaphragm and may properly be considered as a part thereof.

One difficulty encountered in such prior structures resides in the fact that the frictional engagement of the wear ring with said radial surface has a pronounced tendency to twist the flexible diaphragm when the machine is started and while it is running. This twisting tends to break down the diaphragm and otherwise to impair the operation of the seal. The diaphragms in such prior structures, also, have been capable of withstanding only relatively low fluid pressures, and often have become excessively distorted or ruptured when subjected to relatively high fluid pressure at one side thereof.

Attempts have been made to provide positive means for counteracting these twisting and distorting or rupturing forces, but such attempts have usually involved the use of additional parts provided solely for those purposes, and, hence, have involved additional costs.

An important object of the present invention is the provision of a rotary seal wherein positive means are provided for preventing such twisting, excessive distortion, or rupture of the flexible diaphragm without requiring the use of any additional part or parts functioning solely for those purposes.

Another important object of this invention is the extended utilization, in a rotary seal, of spring means, which function to maintain a wear ring in its mentioned running seal engagement with one of the machine elements, in such manner that the spring means serve also as positive means for opposing or preventing such twisting, excessive distortion, or rupturing of the flexible diaphragm.

Another important object of this invention is the provision, in a rotary seal, of means for opposing or preventing such twisting, excessive distortion, or rupturing, and in which the said opposing influence is exerted substantially uniformly about the circumference of the seal.

The foregoing and other objects are accomplished according to the present invention, in its broader aspects, by providing an annular spring having the hitherto recognized function of urging a wear ring into and maintaining it in its mentioned running seal engagement with one of two relatively rotatable machine elements, and intimately associating said spring with a flexible web portion of a diaphragm to reinforce or support the web against such twisting, excessive distortion or rupture. The mentioned spring, preferably, is of flat metal and substantial surface portions thereof are, preferably, in intimate, face-to-face association with an adjacent surface of a flexible portion of the diaphragm to afford such support to the latter.

Although the present inventive concept may be utilized in various ways, nevertheless, only a preferred few of various structures embodying this invention are shown for illustrative purposes, in the accompanying drawings in which:

Figure 1 is a view of a rotary seal according to a preferred embodiment of the present invention shown in association with a machine casing and an impeller or other member mounted upon a shaft; the seal being shown in radial section in the upper part of the figure and in side elevation in the lower part of the figure.

Figs. 3, 4, 5 and 7 are views of several other embodiments of this invention; these views being of the same general character as Fig. 1 except that only the upper half of the structure is shown.

Fig. 2 is a fragmentary perspective view of a spring of the character employed in the embodiment of Fig. 1.

Fig. 6 is an axial sectional view of corresponding intermediate portions of the diaphragm and spring illustrated in Fig. 5, this section being taken on the line 6—6 of the latter figure.

Fig. 8 is a fragmentary perspective view of the spring employed in the embodiment illustrated in Fig. 7.

The first embodiment, illustrated in Figs. 1 and 2, comprises a relatively rigid, generally cup-shaped metal shell 20 having a cylindrical wall 21 adapted to be press-fitted into a bore 22 in a pump or other machine casing 23, and a central aperture 24 through which a shaft 25 extends. To give additional strength to the shell, the latter's radial wall 26 may be formed with an offset 27.

The cylindrical wall 21 is shown as being formed at its free end into an annular diaphragm-gripping portion which is generally U-shaped in cross-section and consists of a radially outwardly extending wall 28 continuing from the outer end of the cylindrical wall 21, an axially extending wall 29 which, with the wall 28 forms an annular recess into which outer peripheral portions of a flexible diaphragm 30 and a flat metal spring 31 may be seated with a washer 32; and the said spring, diaphragm and washer may be firmly clamped within said recess by an inturned flange 33 which extends inwardly from one end of the wall 29. It should be understood that the shell 20 is originally formed without the flange 33 and that the latter is swaged inwardly only after the spring, the diaphragm and the washer have been placed in the mentioned recess in the order named.

The diaphragm 30 is annular and preferably is molded of rubber or flexible rubber-like or synthetic rubber material such as neoprene. It is illustrated as formed with an outer radial flange 34, a generally U-shaped intermediate web portion 35 and an inner peripheral wear ring holding portion 36 which may be formed with an annular recess 37 into which is seated a wear ring 38 having a radial sealing surface 39 in running seal engagement with a radial sealing surface 40 formed on an impeller 41 which is fixed upon the shaft 25 to rotate therewith. The surface 40, of course, may be on an enlarged shaft portion or on a collar or other member fixed upon the shaft.

The wear ring 38 may be of any relatively hard material suitable for the purpose and may be merely seated within the recess 37. However, it may be preferred to form the wear ring of a suitable moldable composition such as Bakelite which may be molded simultaneously with the flexible diaphragm with the moldable composition which is to constitute the ring 38 disposed adjacent to the material which is to constitute the diaphragm so that when the molding is completed the wear ring may be firmly integrated with the flexible diaphragm. A separately formed wear ring, also may be suitably bonded to the diaphragm. In any event, the diaphragm and wear ring are so closely related that the wear ring may sometimes properly be considered as a part of the diaphragm.

The spring 31 is preferably cut from suitable sheet, spring metal and pressed to its annular form shown in the drawings. It is of the same general shape in cross-section as the flexible diaphragm 30 and, preferably, is formed with an outer peripheral flange 42 and an adjoining U-shaped portion 43 which has a circumferential series of radially extending cuts or slits 44, defining a circumferential series of spring fingers 45. The bottoms of the mentioned slits and fingers preferably are located at some distance axially from the flange 42 so as to provide a relatively rigid non-slitted cylindrical portion 46. The spring is in contact with the diaphragm's web portion 35 throughout a sufficiently substantial part of the area of the latter that it serves, among other purposes, to support the diaphragm against twisting and against excessive distortion from high-fluid pressure at one side thereof. This contact of the spring with the said web portion is sometimes referred to herein as "supporting or embracing contact or engagement."

The spring 31, preferably, is initially associated with the diaphragm 30 at the time the latter is being molded so that the material constituting the latter flows into the slits 44. If desired, the spring 31 may be suitably prepared as with an adhesive coating or otherwise treated before being incorporated with the diaphragm during the molding of the latter, to assure a firm bond between the spring and the diaphragm. This bond, of course, is enhanced by the fact that the fingers 45 are at least partially embedded in the diaphragm material.

It will be observed that the relatively rigid flange 42 and the relatively rigid portion 46 of the spring seat intimately against the inner surfaces respectively of the radial wall 28 and the cylindrical wall 21 of the shell and constitute rigid mounting means for supporting the outer margin of the diaphragm. The said outer margin of the diaphragm, furthermore, is firmly held between the flange 42 and the washer 32 when the flange 33 is swaged in during the assembling of the device.

The spring fingers 45 may flex freely in a generally axial direction, but, as those fingers are integral at their bases with the rigid cylindrical portion 46 of the spring, the latter exerts a substantial restraint against any twisting movement of the spring fingers and, indeed, against any movement of said fingers other than the mentioned generally axial movement thereof. It should be apparent therefore, that even though the frictional engagement between the surfaces 39 and 40 may have a tendency to cause rotation of the wear ring 38 and twisting of the diaphragm 30 when the impeller 41 rotates, nevertheless, the flat metal spring 31 and more particularly, the fingers 45 of the latter very adequately oppose such rotation of the wear ring and prevent material twisting of the diaphragm. The spring also substantially reinforces the web 35 of the diaphragm to enable it to resist material deformation or rupture which, otherwise might occur as a result of high fluid pressure at one side of the diaphragm.

When the sealing device is manufactured and before it is placed into service, the spring 31 and the diaphragm 30 are in what might be termed their normal or unstressed condition in which the over-all axial dimension of the device would be somewhat greater than when it is in service. When the device is placed into service, as shown, for example, in Fig. 1, the several machine parts are so proportioned that, when assembled, the impeller 41 presses the wear ring 38 axially inwardly with respect to the shell, thereby shortening the over-all length of the sealing device and imposing a stress upon the diaphragm 30 and more particularly upon the spring 31 the reaction of which is operative through the diaphragm to yieldably maintain the described running seal coaction between the wear ring and the impeller. Thus, the spring serves the several purposes of maintaining the described running seal effect, and opposing any tendency of the wear ring 38 to rotate with the shaft and of the diaphragm 30 to twist or otherwise become deformed or ruptured.

The second embodiment of this invention, which is illustrated in Fig. 3 differs from the first embodiment chiefly in that the spring 31a instead of being bonded to and embedded in the diaphragm 30a is formed and assembled as a separate part of the device. Under this arrangement the fingers 45a of the spring need not necessarily contact the diaphragm at their free ends. As will be seen from the drawing, however, a very substantial part of each finger 45a presses axially against the convex surface of the web portion 35a of the diaphragm, thereby maintaining running sealing engagement between the wear ring 38 and the impeller 41. In addition, the frictional engagement between the spring fingers and the diaphragm opposes rotation of the wear ring and twisting or other distortion or rupture of the diaphragm.

The third embodiment of the invention, which is illustrated in Fig. 4, differs from the described first embodiment chiefly in that the shell 20 is omitted and that, to give the structure rigid support such as is supplied by said shell, a washer 32b has a cylindrical flange 32x which gives the relatively flat washer 32 of Fig. 1. The washer 32b has a cylindrical flange 32x which gives the washer considerable rigidity and serves to hold a corresponding portion of the diaphragm firmly between it and the relatively rigid portion 46 of the spring. An angular washer as just described functions to support the outermost portions of the diaphragm rigidly and yields an additional means for preventing twisting of the diaphragm particularly in the vicinity thereof disposed between the flange 32x of the washer and the rigid portion 46 of the spring.

A sealing device such as is illustrated in Fig. 4 is force-fitted into the bore 22 of the machine casing 23 with the rigid portions 46, 42 of the spring in direct contact with the said machine casing. If the spring 31b of that structure is of relatively thin material, as often would be the case, or if the spring is stamped out of flat strip material, as may be done as a matter of economy in production, the portions 46 and 42 of the spring might not possess sufficient rigidity to serve as a sole means for associating the diaphragm with the machine casing. However, by making the washer 32b of angular cross-sectional shape, that washer is rendered substantially rigid and may be so proportioned in radial dimension in relation to the adjacent diaphragm portion and to the spring and the machine casing that its cylindrical flange 32x exerts a substantial radial compressive force exerted outwardly upon the corresponding cylindrical portion of the diaphragm and upon the portion 46 of the spring whereby to confine the said diaphragm and spring portions very securely between the flange 32x of the washer and the opposed inner cylindrical surface of the bore 22 of the machine casing.

When the outer marginal portions of the spring, the diaphragm, and the washer are seated in a recess 47 formed in the machine casing, the radial flange of the washer 32b serves to firmly hold the radial flange 34 of the diaphragm and the peripheral flange 42 of the spring between it and a radial surface 47a of the said recess in the machine casing. Thus, in the third embodiment, the metal shell is dispensed with by merely providing a slightly enlarged washer 32b which is angular in form to give it the necessary rigidity enabling it to function in place of a shell. In addition to economizing by omitting the shell in the third embodiment, further economies are realized because some assembly steps are avoided, as, for example, the swaging in of the shell which is necessary to form the flange 33 of the shell in Fig. 1.

In order to make the seal of the third embodiment as a unitary seal, it is preferred that the washer 32b be suitably bonded to the diaphragm. This can be done by employing adhesive as a bonding agent between those parts or the washer 32b may otherwise be treated to enhance its bond with the diaphragm. It may be feasible, also, at least in some slight variations of the design of Fig. 4, to have the washer 32b bonded to the diaphragm by being associated therewith during the molding of the latter.

A fourth embodiment of the present invention may be as illustrated in Figs. 5 and 6. In this structure both the metal shell 20 and the washer 32 or 32b are dispensed with, and, hence, it may very economically produced. To accomplish this, the spring 31c is so associated with the diaphragm 30c that a substantially rigid cylindrical portion 46c of the spring is disposed at the inner side of a cylindrical portion 30x of the diaphragm and a substantially rigid radial flange 42c of the spring is disposed at the outer radial surface of the radial flange 34 of the diaphragm. The spring fingers 45c preferably extend through the body of the diaphragm's web portion 35 so that a substantial portion of each of said fingers presses against or is embedded in the outer convex surface of the diaphragm very much as such fingers are associated with the diaphragm in the several previously described embodiments. In other words, the radially outermost portion of the diaphragm is disposed about the outer surface of the spring and the greater part of the web portion 35 of the diaphragm is disposed within the fingers of the spring.

In the fourth embodiment, increased rigidity may be achieved, for the purpose of firmly holding the device within the recess 47 in the machine casing, by making the spring portions 42c and 46c continuous in the sense that they shall not be interrupted, split or broken at any circumferential point, but shall be in the form of a continuous unbroken ring. If the spring in this embodiment is stamped from strip flat spring material, then the mentioned portions of the spring may be rendered continuous by having adjacent ends of the spring blank abutting each other and welded or otherwise fixedly secured to each other. It will be observed that the spring portions 42c, 46c function very much like the washer 32b of Fig. 4 in that the portion 46c may be so proportioned that it will squeeze the portion 30x of the diaphragm firmly and fluid-tightly against the adjacent cylindrical surface of the bore 22 of the machine casing, and the peripheral flange 42c of the spring will confine the flange 34 of the diaphragm fluid-tightly between the mentioned spring portion and the radial wall 47a of the recess 47.

If desired, the spring 31c may be so designed and disposed that it fingers 45c are disposed entirely within the U of the flexible diaphragm. Assuming that the spring in such an arrangement is suitably bonded to the diaphragm it should function as in the other embodiments to maintain the running seal effect between the wear ring 38 and the impeller 41 and also should function to oppose any tendency of the wear ring 38 to rotate or of the diaphragm to twist.

In a fifth embodiment of the invention, illustrated in Figs. 7 and 8, the device is adapted to be fixed upon a shaft 25 and to rotate therewith with a wear ring 38d in running seal engagement with a radially extending portion 48 of a machine casing 23d. In this structure a spring 31d, instead of having an outer peripheral flange as in the hereinbefore described embodiments, is formed with an inner peripheral flange 42d adjoining one end of a relatively rigid cylindrical portion 46d from which arcuate fingers 45d extend radially outwardly. The diaphragm 30d is substantially the reverse in design of the diaphragm of the third embodiment shown in Fig. 4 in having an inwardly extending radial flange 34d and a wear ring holding portion 36d which is at the radially outermost part of the device. The spring 31d extends about the exterior of the diaphragm and the said spring and the wear ring are preferably bonded to said diaphragm during the molding of the latter.

In the fifth embodiment, also the spring preferably is circumferentially continuous and the portions 42d and 46d thereof are relatively rigid so that the device may be force-fitted upon the shaft 25 with the flange 42d of the spring seated against a shoulder 25a of the shaft. In order to enhance the fixation of the device upon the shaft a shaft collar 49 may be force-fitted and/or secured by one or more set screws (not shown) upon a reduced portion 25b of the shaft with the collar 49 pressed firmly against the right face of the diaphragm flange 34d. The spring in a seal according to this embodiment serves as a positive means for driving the wear ring 38d with the shaft and also for preventing twisting of the diaphragm or excessive distortion thereof from high fluid pressure.

It may be observed that, in all the illustrated embodiments, the flexible diaphragms are so designed that one end portion thereof is quite freely shiftable axially relatively to the other end thereof so that, even in the presence of substantial end play in the shaft, the relatively free flexing of the diaphragm enables the wear ring to remain in running seal engagement with a coacting radial sealing surface of one of the two machine elements under the spring's force which is exerted substantially uniformly about the circumference of the seal. Also, because of the design of the springs, only a relatively slight deflection thereof occurs in operation of a device even when the greatest permissible end play in the shaft is present, hence, the spring force imposed upon the wear ring remains substantially uniform irrespective of the degree of permissible end play of the shaft or the wear of the wear ring. The springs in all the illustrated embodiments perform the added function of reinforcing the web portions of the various illustrated diaphragms against collapse resulting from high fluid pressure at one side of the diaphragm; and in most of the illustrated embodiments the spring also functions as a positive means for preventing twisting or excessive distortion of the diaphragm; thus no other or special means are needed for those purposes.

Even in the illustrated embodiments employing a metal shell, the entire seal is very simple indeed and consists of only a few parts which are readily and economically made and assembled. Of course, in some of the embodiments illustrated, substantially fewer parts are employed with corresponding savings in production costs.

In most rotary seals heretofore developed it has been considered necessary to provide coiled wire springs for maintaining the described running seal effect, but the flat metal springs of the present invention are satisfactory for that purpose and, instead of requiring special spring producing facilities, may be cut from sheet spring material by means of dies in more or less conventional punch presses, thereby minimizing the cost of producing the springs.

It will thus be realized that the present invention effectively accomplishes the various objects hereinbefore recited and, in so doing, yields a simple, effective and economically produced rotary seal. Obviously the concept of the present invention may be utilized in various ways other than those illustrated and described herein without departing from the spirit of the invention as set forth in the accompanying claims.

What we claim is:

1. A unitary sealing device for effecting a seal between two associated relatively rotatable machine elements, comprising a rigid metal mounting element having a cylindrical wall adapted for press fit with a cylindrical surface of one of said machine elements and an integral, annular, channel portion, at one end thereof, which is U-shaped in radial section with its side walls extending radially, its open side facing radially toward the other of said machine elements, and one radial wall of said channel portion being a continuation of one end of said cylindrical wall; a flexible diaphragm which is U-shaped in radial section and is associated with said mounting element with its open side facing axially in the same direction as said one end of the mounting element, one peripheral extremity of said diaphragm being adapted to effect a sliding seal with a radial surface associated with said other machine element and the other peripheral extremity of the diaphragm having a radial flange which is disposed within said channel portion for clamping thereinto; and annular spring element of sheet metal of substantially uniform thickness having a relatively rigid cylindrical portion coacting with said cylindrical wall of the mounting element to derive support therefrom, a radial flange integral with said cylindrical portion at one end thereof and extending radially into the channel of said mounting element, and spring fingers, having base ends integral with said cylindrical portion of the spring element, which fingers curve intimately about and in firm supporting engagement with the convex face of said diaphragm and are adapted to press against said convex face to urge the latter, with the diaphragm's said one peripheral extremity, toward the direction to which the open side of the diaphragm faces to maintain the said one peripheral extremity of the diaphragm in sliding sealing engagement with such a radial surface associated with said other machine element; the side walls of said channel portion of the mounting element having the said radial flanges of the spring element and diaphragm clamped firmly between them.

2. A sealing device according to claim 1, wherein the rigid metal mounting element is adapted for press fit with an inner cylindrical surface of an opening in a machine casing and the said one peripheral extremity of the diaphragm is adapted to effect a sliding seal with a radial surface associated with a shaft which extends through said opening.

3. A sealing device for effecting a seal between two associated relatively rotatable machine elements, comprising an annular, flexible diaphragm which, in radial, axial section, is in the shape of an axially facing U, one leg of which is adapted for sliding sealing engagement with a radial surface associated with one of said machine elements and the other leg of which is cylindrical and has a radial flange toward its free end and is adapted for fixed sealing association with the other of said machine elements and the intervening portion of which is a flexible web of semi-circular shape in radial, axial section, which web is integral with said cylindrical leg as a gradually curved continuation thereof; and an annular, axially facing, U-shaped spring, of sheet metal of substantially uniform thickness, having a sole, relatively rigid cylindrical portion intimately associated with the cylindrical leg of the diaphragm to afford support thereto, a radial flange, toward the free end of the spring's said cylindrical portion, intimately associated with said radial flange of the diaphragm to afford support thereto, and a plurality of substantially semi-circular, spring fingers, extending from the other end of the spring's said cylindrical portion, substantially about and in intimate association with the said web to support the latter and urge the said one leg of the diaphragm toward sliding sealing association with such a radial surface; the diaphragm's said cylindrical leg with its associated cylindrical spring portion being adapted for press-fit, substantially fluid-tight, association with a cylindrical surface fixedly associated with said other machine element, and the diaphragm's said radial flange with its associated radial flange of the spring being adapted for substantially fluid-tight abutment with a radial surface fixedly associated with said other machine element.

4. A sealing device according to claim 3, wherein the said other leg of the flexible diaphragm is adapted for fixed sealing association with an opening in a machine casing and the said one leg of the diaphragm is adapted for sliding sealing engagement with a radial surface associated with a shaft which extends through said opening.

5. A sealing device according to claim 3, wherein the said other leg of the flexible diaphragm is adapted for fixed sealing association with a shaft and the said one leg of the diaphragm is adapted for sliding sealing engagement with a radial surface associated with a machine casing wall through which said shaft extends.

6. A sealing device according to claim 3, wherein the cylindrical portion of the spring extends intimately about the exterior of the cylindrical leg of the diaphragm and the radial flanges of said cylindrical portion and cylindrical leg extend radially outwardly in intimate face-to-face engagement; the device further including a rigid supporting ring having a cylindrical flange intimately underlying the inner surface of the said cylindrical leg of the diaphragm and a radial flange in intimate face-to-face engagement with the said radial flange of the diaphragm; the said supporting ring being adapted to support the said cylindrical portion and cylindrical leg of the spring and diaphragm and the two latter's said radial flanges to hold them in firm fixed sealing association with adjoining cylindrical and radial surfaces defining a shoulder of said other machine element.

7. A sealing device according to claim 3, wherein the said cylindrical portion of the spring extends intimately about the interior of the cylindrical leg of the diaphragm, and said spring fingers extend from said cylindrical portion through said web, and, thence, substantially about and in intimate association with the web's convex surface, to support said cylindrical leg of the diaphragm and hold it firmly in fixed sealing association with a cylindrical surface of a related machine element.

8. A sealing device according to claim 3, wherein the said cylindrical portion of the spring extends intimately about the exterior of the cylindrical leg of the diaphragm and is adapted for press-fit association with a cylindrical surface of a related machine element to hold the device in fixed sealing association with the latter machine element.

ALBERT M. CHAMBERS, Jr.
LEO F. JONES.

References Cited in the file of this patent

UNITED STATES PATENTS

| Number | Name | Date |
|---|---|---|
| 1,969,008 | Hubbard | Aug. 7, 1934 |
| 2,088,703 | Hubbard et al. | Aug. 3, 1937 |
| 2,132,042 | Nelson | Oct. 4, 1938 |
| 2,222,654 | Donaldson | Nov. 26, 1940 |
| 2,310,607 | Batesole | Feb. 9, 1943 |
| 2,347,118 | Matter | Apr. 18, 1944 |
| 2,395,107 | Dodge | Feb. 19, 1946 |
| 2,419,385 | Bieir | Apr. 22, 1947 |
| 2,426,047 | Payne | Aug. 19, 1947 |
| 2,466,533 | Chambers | Apr. 5, 1949 |
| 2,467,049 | Peterson | Aug. 12, 1949 |
| 2,512,749 | McCloskey | June 27, 1950 |
| 2,560,557 | Curtis | July 17, 1951 |

FOREIGN PATENTS

| Number | Country | Date |
|---|---|---|
| 522,720 | Great Britain | June 25, 1940 |